July 16, 1963 C. L. WANLASS 3,098,158

MULTIVIBRATOR CIRCUITS EMPLOYING VOLTAGE BREAK-DOWN DEVICES

Filed June 6, 1955 3 Sheets-Sheet 1

VOLTAGE BREAK-DOWN CHARACTERISTICS OF SILICON DIODE

BISTABLE CONFIGURATIONS

FREE RUNNING OR MONOSTABLE CIRCUITS

INVENTOR.
Cravens L. Wanlass

BY [signature]
and [signature]
His Attorneys

INVENTOR.
Cravens L. Wanlass

BY [signature]
and [signature]
His Attorneys

July 16, 1963 C. L. WANLASS 3,098,158

MULTIVIBRATOR CIRCUITS EMPLOYING VOLTAGE BREAK-DOWN DEVICES

Filed June 6, 1955 3 Sheets-Sheet 3

| | A | B | C | D |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

INVENTOR.
Cravens L. Wanlass
BY [signature]
and [signature]
His Attorneys

United States Patent Office 3,098,158
Patented July 16, 1963

3,098,158

MULTIVIBRATOR CIRCUITS EMPLOYING VOLTAGE BREAK-DOWN DEVICES

Cravens L. Wanlass, Whittier, Calif., assignor, by mesne assignments, to Thompson Ramo Wooldridge Inc., Cleveland, Ohio, a corporation of Ohio
Filed June 6, 1955, Ser. No. 513,426
8 Claims. (Cl. 307—88.5)

This invention relates to multivibrator circuits employing voltage break-down elements and, more particularly, to circuits of this type wherein devices having a predetermined break-down potential are utilized in a cross-coupled amplifier arrangement, each voltage break-down device being in current series with an associated amplifier. More specifically, the invention provides transistor multivibrator circuits of this type wherein high stability is achieved in addition to high-speed trigger response, improved pulse sensitivity, and improved power supplying capacity.

In its generic application the invention may be practiced in any of the three basic types of multivibrator circuits, namely: free running; monostable; and bistable. For illustration purposes the principal emphasis herein will be placed upon the bistable configuration, where static stability is of the essence and trigger response, pulse sensitivity, and power supplying capacity are important parameters in digital computer applications. It will be understood, however, that the basic principles which are considered herein relating to the utilization of voltage break-down devices as current-controlling elements, in association with cross-coupled amplifiers, may be practiced in any of the three types of multivibrators, and the emphasis by way of illustration on the bistable configuration is not intended as a limitation.

Furthermore, specific consideration is made herein of transistor flip-flops or bistable multivibrators where the improvement of the invention is extremely important. The reason for this will be more fully understood from the following discussion relating to the transistor multivibrator circuits of the prior art and the inherent limitations thereof.

Previously devised transistor multivibrator circuits have been of two general types. In the first type of circuit the desired characteristic is achieved by operating the transistor in its negative resistance region of conductance. This is achieved in the case of a point contact transistor by connecting a relatively high impedance in series with the base of the transistor, resulting in a regeneration effect. Thus typically the applicable patents in this field show the negative resistance characteristic as, for example, is done in FIGS. 2, 3; 2, 6; 2, 5; 3, 6 shown respectively in Patents 2,579,336 to A. J. Rack; 2,614,140 to J. G. Kreer, Jr.; 2,614,142 to J. O. Edson; and 2,622,212 to A. E. Anderson et al.; showing bistable multivibrators, and FIG. 2 of Patent 2,649,895 to A. W. Lo showing monostable circuits.

Transistor trigger circuits utilizing this negative resistance function are highly sensitive to changes in circuit parameters, and consequently the above described patents are primarily concerned with overcoming this problem. However, the operation of even these improved circuits has still proved to be somewhat marginal and reliability is achieved only at the expense of rather complicated circuit arrangements.

Furthermore, due to recent developments in digital computer technique, it has become advantageous in many situations to have both a signal representing a binary variable and its complement. Consequently, where but a single transistor is utilized to store a binary-variable reference signal, it becomes necessary to add additional circuits in order to obtain the desired complementary signal. In other words, where it is desirable to have both the signal and its complement available, the most convenient and stable arrangement is found in the cross-coupled amplifier arrangement or Eccles-Jordan trigger circuit.

As a result of the inherent instability of the single transistor multivibrator circuits, as well as the necessity for complementary signals, another type of circuit has been devised which employs voltage feedback. In this circuit a relatively low impedance source point on each of the two amplifiers employed is utilized to control the condition of the other amplifier through a high impedance input circuit. The voltage feedback technique has been employed in all of the various types of multivibrator circuits.

As will be more fully understood from the detailed description which follows, the conventional voltage feedback technique is inherently self-limiting with respect to the range of voltage changes which may be obtained for the two stable states. Consequently, the circuit stability, which is a function of this voltage difference, is somewhat limited and circuit parameter changes as well as power supply variations may cause spurious triggering.

Where transistors are employed, it has frequently become the practice to utilize the negative resistance characteristic as well as the Eccles-Jordan voltage feedback in order to insure static stability. Furthermore, as an additional means of stabilizing the arrangement it has also become common practice to utilize a common emitter load impedance, which is similar to the common cathode load impedance previously utilized in a differential amplifier. This practice is shown specifically in the patent to A. E. Anderson et al., No. 2,662,212.

Other multivibrator circuits employing the voltage feedback technique are shown in the following patents: 2,531,076 to R. P. Moore, Jr.; 2,533,001 to E. Eberhard; 2,569,345 to R. F. Shea; and 2,591,961 to F. P. Moore, Jr.; where bistable circuits are shown; and in 2,641,717 to D. H. Toth, where a one-shot or monostable multivibrator is shown. It may be noted that in some of these patents, as in the Anderson et al. patent above, both the negative resistance characteristic and the voltage feedback arrangement are employed.

While the common emitter biasing arrangement makes it possible to achieve greater stability, although at the expense of an increase in circuit complexity, it also results in a multivibrator circuit which is difficult to trigger without a relatively large voltage pulse. The fallacy of this approach for transistors is evident due to the fact that the transistor amplifier is current sensitive and therefore the increased voltage which is required in order to overcome the biasing action of the common emitter impedance does not necessarily provide the required triggering current, and may therefore waste a certain amount of triggering power.

In addition to this, the larger voltage pulse which is required in conventional transistor trigger circuits cannot be effective until any distributive or shunt capacity has been charged, and therefore the speed of the trigger response is somewhat decreased for the same input power. Consequently, the conventional voltage feedback arrangement utilizing a common emitter impedance to ensure stability has resulted in a reduction of the speed of trigger response for a given input signal power, and a reduction in the pulse sensitivity; yet, at the same time, this technique has not increased the stability of the circuit to any considerable extent.

The present invention obviates the above and other disadvantages inherent in the prior art circuit arrangements by providing a multivibrator circuit wherein each of the two amplifiers employed has a voltage break-down element connected in current series with it. According to the basic principle of the invention this voltage break-down element is biased so that when a relatively low voltage is across it, the associated current path is virtually open circulated, but becomes an effective battery when a higher voltage of predetermined value appears across it and then provides a direct current path for the associated amplifier. In this manner, the break-down device functions as a current switch assuming either an open or closed state corresponding to the two states of the multivibrator circuit.

In its general structural form the invention comprises first and second current sensitive amplifiers A1 and A2 having low input impedances which are operable between high and low voltage output conditions, corresponding to low and high current conducting conditions, respectively; the output circuit of amplifiers A1 and A2 being cross-coupled to load impedances Z2 and Z1 which receive an appropriate source potential. The essential feature of the invention then is the inclusion of at least one voltage break-down device in the series current path controlling the input circuit of one of the amplifiers.

Where a bistable configuration is desired two voltage break-down devices D1 and D2 are employed and are connected respectively in the series current path of the input circuit of amplifiers A1 and A2, being also connected to load impedances Z1 and Z2.

In the monostable multivibrator circuit utilizing the principle of the invention the coupling between one of the load impedances and the associate amplifier input circuit is an A.C. coupling, such as may be provided through the utilization of a capacitor, and only one break-down device need be employed in the input circuit of the other amplifier. The free running configuration of the invention then is similar with the inclusion of an A.C. coupling between both load impedances Z1 and Z2 and the associated amplifier input circuits, with break-down devices being in series therewith and insuring sharply varying signal characteristics of the well-known relaxation type.

In accordance with the basic principles of the invention, the break-down devices are selected so that, with appropriate source potentials and amplifier characteristics, a voltage breakdown occurs at a predetermined relatively high voltage and thus establishes this potential through an effective battery source coupled between the output circuit of one amplifier and the current sensitive input circuit of the other. Thus, when one of the cross-coupled amplifiers is in a relatively low conducting, or cut-off, state and its output signal is high (this signal may be referred to herein as E*h*), the disassociated non-linear device controlled thereby is driven beyond its voltage break-down point. At the same time any associated break-down device remains in its prebreak-down state and consequently maintains the associated current path open.

In this state of the multivibrator, then, one of the amplifiers is maintained in a low or non-conducting state due to an effective open circuit in series with its input circuit, the open circuit being provided by its associated break-down device. And the other amplifier is maintained in its high conducting or saturated state where any associated break-down device presents a low impedance and sufficient driving current to its input circuit. This state, of course, need not necessarily be stable and may exist but temporarily, as in the free running or monostable multivibrator.

A suitable voltage break-down device is found in a silicon diode which, when back biased by a voltage which is less than the break-down or Zener voltage, in the order of magnitude of 5 to 10 volts, exhibits an impedance in the order of 100 megohms. Utilization of such a device connected in current series with the low impedance input circuit of an amplifier, such as a transistor, results in a current switching operation wherein one state of the multivibrator, the Zener device may pass a current as low as $10^{-8}$ amperes, or substantially zero amperes, and in the other state, current in the order of amperes may pass providing an increase of current of approximately $10^8$ to one.

It will be shown in the detailed description which follows that the current switching technique of the invention results in a very stable multivibrator where the supply voltage may vary as much as 100% without any change in the state of the circuit. The importance of this improvement is evident when it is considered that the prior art voltage feedback multivibrators are frequently sensitive to power supply changes as low as two or three percent.

A similar voltage break-down characteristic may be obtained from a gas tube where the impedance prior to voltage break-down is virtually infinite and then falls to an extremely low value after the break-down potential is reached, which may be in the order of 50 volts. It may be noted that many other devices exhibit a voltage break-down characteristic with an increase in voltage thereacross and consequently may be suitable.

Once the basic principles of the invention are recognized, as will be more fully understood from the detailed description which follows, a considerable number of equivalent variations will become apparent. For example, the amplifiers may take the form of various types of transistor devices either of the NPN or PNP type, suitable potential selection being made and the break-down devices being arranged in the proper polarity sense if they are polarity sensitive, as is the silicon diode. Furthermore, the invention is applicable as well to the utilization of conventional vacuum tube devices such as the triode.

The load impedance devices Z1 and Z2 may take a multitude of configurations depending upon the type of multivibrator which is required, and the frequency response desired. Where a bistable multivibrator is specified, for example, each load impedance may constitute two resistors connected in series with capacitors shunted across one of the resistors in each series connection, the junctions of the resistors being cross-coupled to the amplifier output circuits. In other arrangements the load impedance may simply comprise a single resistor where output signals are derived at the junction of this resistor and the non-linear device.

In a specific transistor flip-flop arrangement of the invention, two NPN transistors T1 and T2 are employed having their base electrode connected to the anodes of respective silicon diodes D1 and D2, the cathodes of which receive a suitable positive biasing potential +E, through series connected resistors R*a*1, R*b*1; and R*a*2, R*b*2 respectively. Resistors R*b* are shunted by suitable capacitors C1 and C2 which allow a faster triggering response in a well-known manner. The junctions of the resistors R*a* and R*b* then may provide complementary output signals A′ and A which have high levels corresponding to the two stable states of the flip-flop. These output points are also cross-coupled to the collector electrodes of transistors T1 and T2, and the emitters of transistors T1 and T2 are connected together and to ground.

By employing the break-down element in the series current path of the transistor base in this manner, the invention provides a highly stable arrangement where one transistor is virtually open-circuited at its base circuit, and the other transistor effectively has its base electrode connected directly to a source through its circuit load impedance. As a result the circuit parameters and power supply voltages may vary within considerable limits before the Zener device or break-down element changes its state from open to closed, or vice versa. This is to be sharply contrasted with the voltage feedback arrangement where any change in power supply potential causes a change in voltage to the transistor in the low conducting state so that extreme care must be taken to insure that such variations do not approach the triggering level.

An equivalent circuit using PNP transistors may be constructed where a minus potential source is applied to the base electrodes of the transistor through the respective load impedances and the diodes are then poled so that the anodes thereof are connected to the load impedances and the cathodes thereof to the base electrodes. As above, the emitter electrodes may then be connected to ground.

An important feature of the transistor multivibrator configuration is the fact that reliable stability may be achieved without the necessity of any common emitter impedance, as is generally required in accordance with a conventional voltage feedback arrangement. Consequently, a bias level is not set up over which triggering input pulses must rise before the multivibrator will receive sufficient actuating current. Furthermore, the input impedance of the transistor is thereby greatly reduced. The effect of this is an enhanced pulse sensitivity without any sacrifice in static stability, while at the same time an increase in trigger frequency is made possible. The frequency increase is due to the fact that shunt capacities are not very critical since the triggering signals may be of a very low order voltage magnitude. The practice of the invention then makes it possible to obtain true current triggering of the transistor, which is the most desirable practice in view of the fact that the transistor is a current sensitive device.

In accordance with another feature of the invention, the Zener break-down device or diode functions as a voltage or current regulator. Thus it is unnecessary to utilize further clamping diodes where output signals are derived from the collector electrodes of the transistors.

The voltage drive from the multivibrator need not be limited to the Zener voltage since a resistor may be placed in series with the Zener device to raise the voltage thereof to the desired level. In a similar manner, a resistor may be placed in current series with the Zener break-down device to prevent the passage of excessive actuating current to a transistor which may drive it into saturation and make it difficult to trigger the multivibrator to the other state.

It is important in distinguishing the present invention over the prior art to note that the operation of the multivibrator, in accordance with the present invention, is actually inherent in the Zener break-down elements and not in the two-state characteristics of the amplifiers employed; whereas conventional voltage feedback multivibrators depend upon the ability to forward and back bias the amplifiers employed.

Accordingly, it is an object of the present invention to provide multivibrator circuits with improved stability.

Another object is to provide multivibrator circuts wherein static stability is achieved without limiting the speed of pulse response, the pulse sensitivity, or the power-supplying capacity of the circuit.

A further object of the invention is to provide a cross-coupled amplifier type of multivibrator circuit having improved stability and pulse sensitivity.

Yet another object of the invention is to provide transistor multivibrator circuits which are highly stable and yet nevertheless are not limited in pulse sensitivity by the stabilizing means employed.

Still a further object is to provide a highly stable transistor flip-flop or bistable multivibrator having high-speed trigger response, improved pulse sensitivity, and improved power supplying capacity.

A more specific object is to provide a transistor multivibrator wherein two transistors T1 and T2 have their collector electrodes cross-coupled to separate load impedances, at least one base electrode receiving actuating current through an associated voltage break-down device.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 3A:
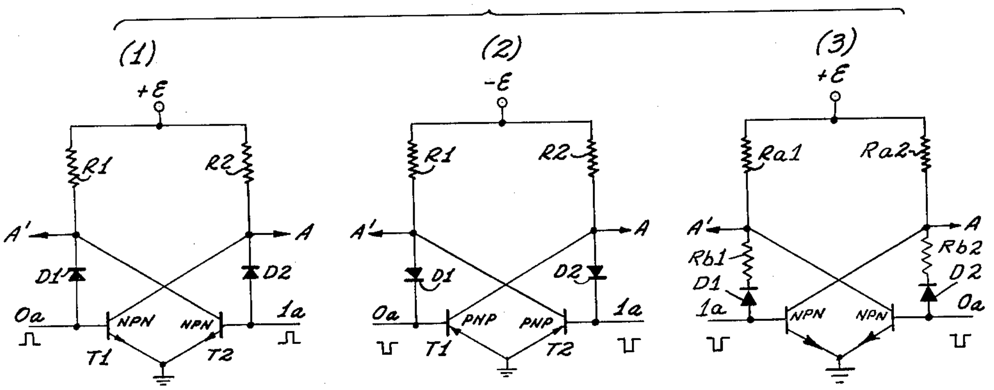

FIG. 3*a* illustrates three types of bistable multivibrators arranged in accordance with the principles of the present invention, where: (1) utilizes two NPN transistors and diodes as voltage breakdown devices, (2) utilizes two PNP transistors and diodes, and (3) shows the use of series resistors to increase the output voltages over the Zener break-down voltage.

Figure 3B:
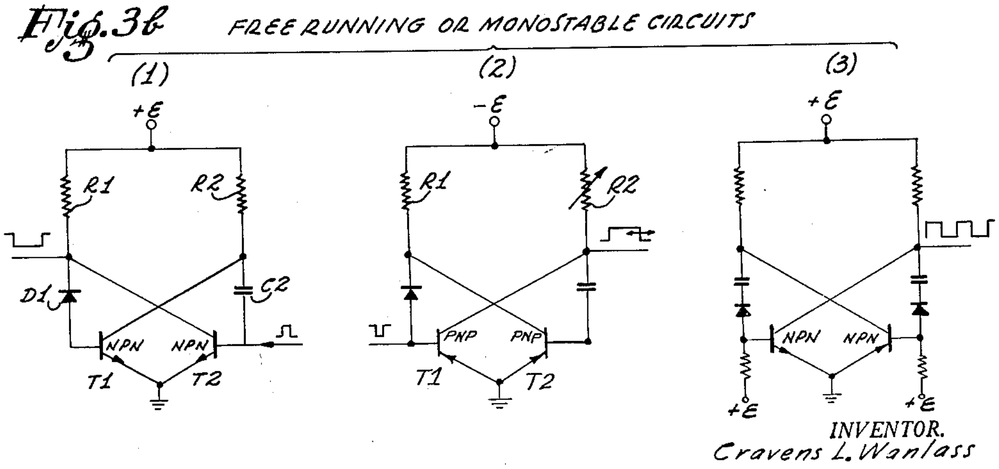
Figure 4:
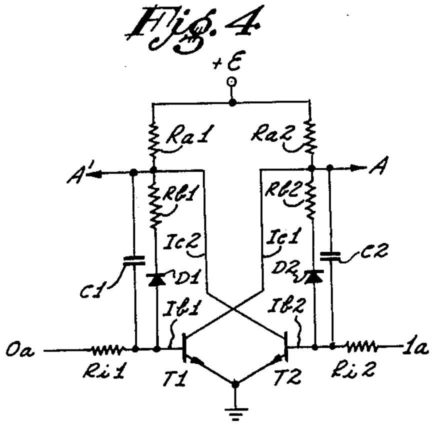
Figure 5:
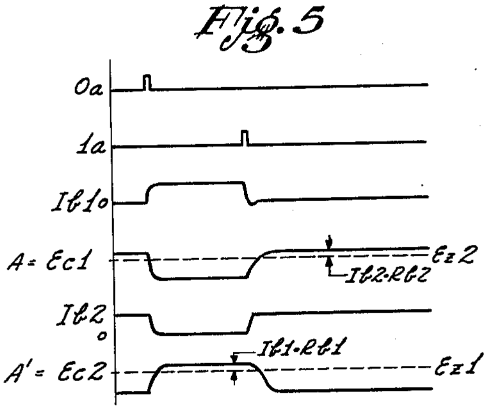
Figure 6A:
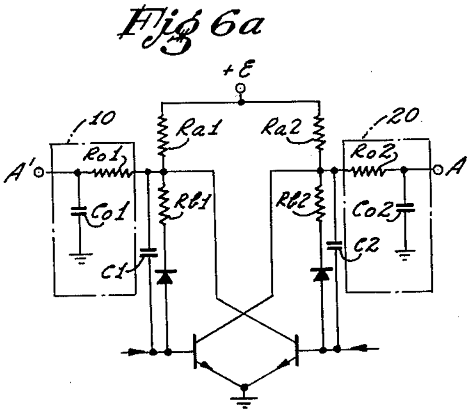
Figure 6B:
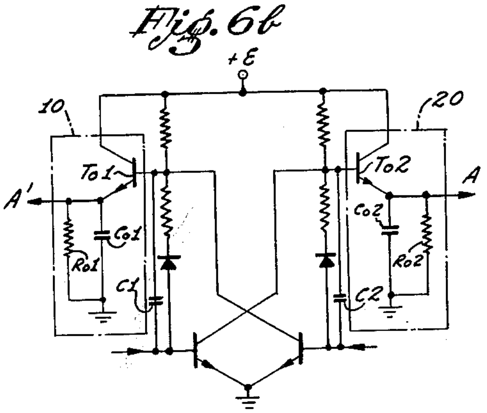
Figure 6C:
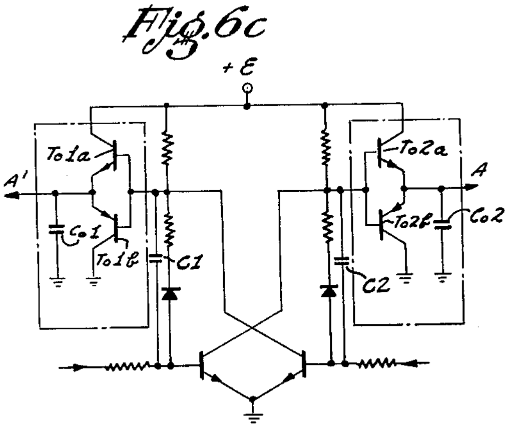
Figure 6D:
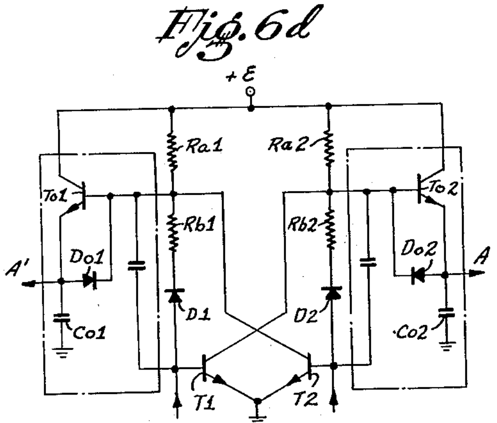
Figures 7, 8:
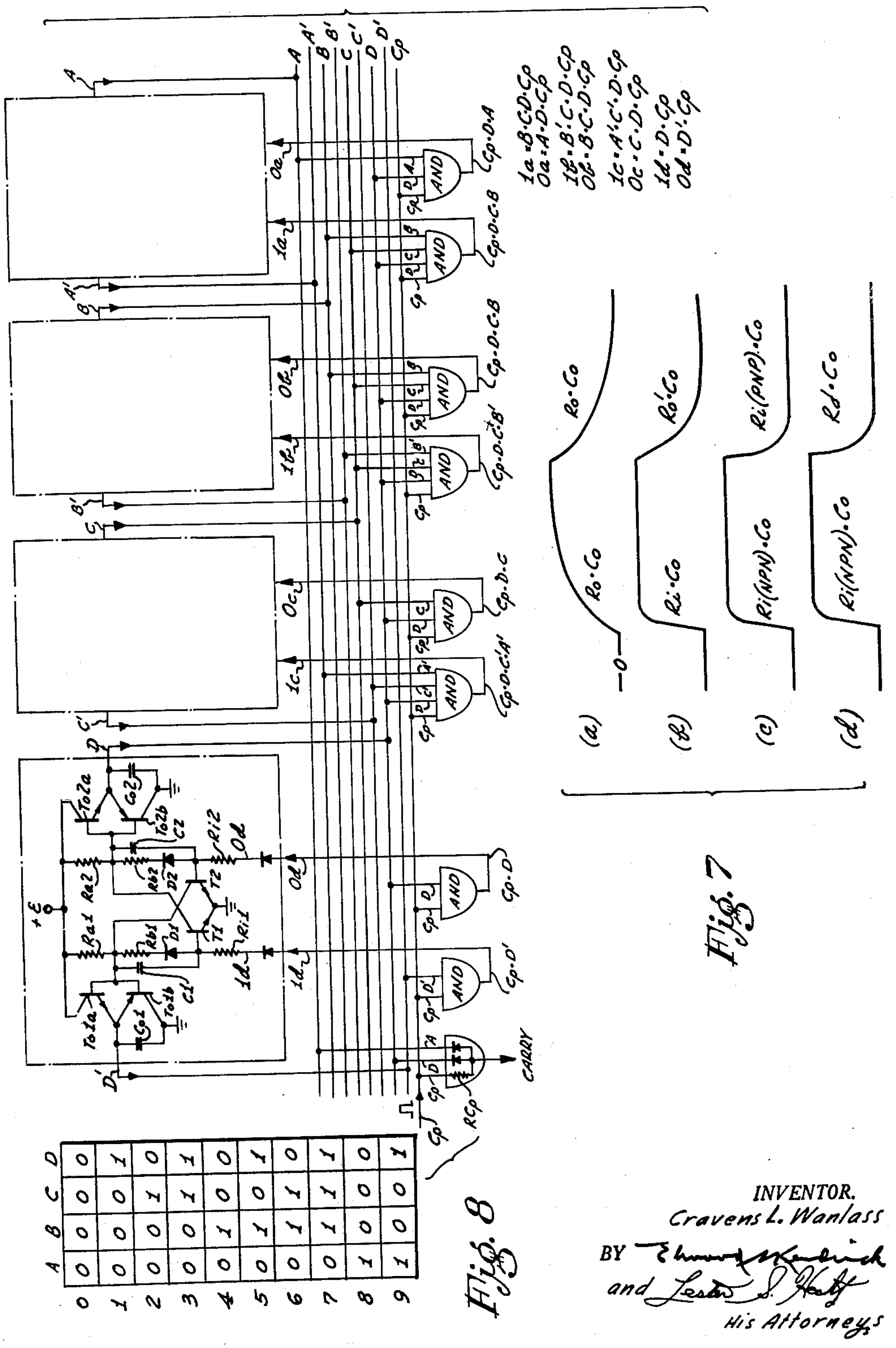

FIG. 3*b* illustrates typical free-running or monostable circuits where: (1) utilizes two NPN transistors in a monostable circuit, (2) utilizes two PNP transistors in a monostable circuit, and (3) illustrates the utilization of two NPN transistors in a free-running multivibrator arrangement;

FIG. 4 shows a more detailed circuit arrangement of a bistable transistor multivibrator in accordance with the present invention;

FIG. 5 is a composite set of waveforms illustrating the operation of the embodiment of FIG. 4;

FIGS. 6*a*, 6*b*, 6*c* and 6*d* illustrate four types of signal storage output circuits which may be employed in accordance with the present invention;

FIGS. 7*a*, 7*b*, 7*c* and 7*d* are waveforms corresponding to the signal storage characteristic of the circuits of FIGS. 6*a*, 6*b*, 6*c* and 6*d*, respectively; and FIG. 8 is a binary-coded decimal counter employing transistor flip-flops designed in accordance with the present invention.

Figure 1:
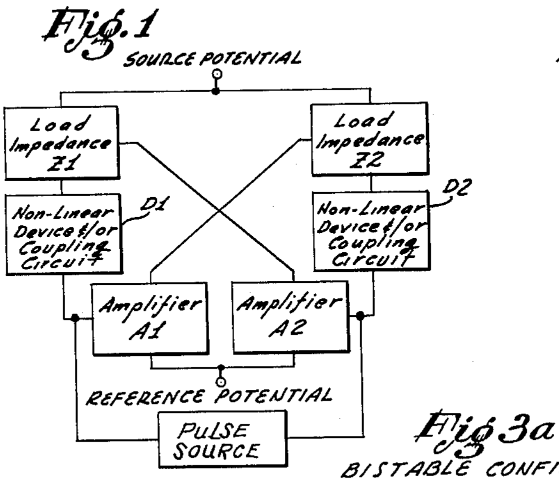
FIG. 1 is a block diagram illustrating the basic embodiment of the invention.

Reference is now made to FIG. 1 where the basis embodiment of the present invention is shown in block diagram form. As indicated in FIG. 1 the invention comprises amplifiers A1 and A2 having output circuits which are cross-coupled to load impedances Z2 and Z1 respectively, impedances Z receiving a suitable source potential.

The important feature of the invention is the inclusion of at least one break-down device in the coupling circuit between one load impedance and its associated amplifier input circuit, the association being indicated by using the same reference number therewith. Thus in one arrangement of the invention impedance Z1 is coupled to the input circuit of amplifier A1 through a voltage break-down device D1.

In FIG. 1 then two devices D1 and D2 are shown which may be voltage break-down devices and/or coupling circuits. Where a bistable multivibrator is desired, both of circuits D1 and D2 include a voltage break-down device, such as a silicon diode, whereas in other multivibrator arrangements such as the monostable multivibrator, only one of circuits D1 and D2 need include a voltage break-down device. The other circuit then may consist of an A.C. coupling device such as a capacitor.

Figure 2:
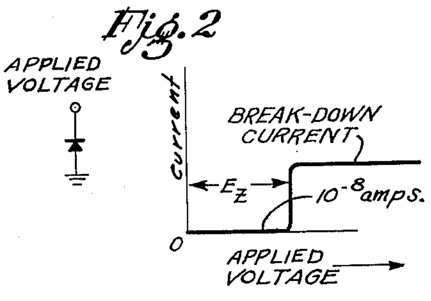
FIG. 2 is a diagram illustrating the voltage break-down characteristic of a silicon diode which may be employed as the voltage break-down device, in accordance with the present invention.

A type of voltage break-down characteristic which is suitable is shown in FIG. 2 corresponding to the silicon diode characteristic. As indicated in FIG. 2, when a silicon diode is back biased by a relatively small positive potential applied across its cathode and anode terminals, its impedance is in the order of magnitude of 100 megohms. This means simply that virtually no current passes therethrough. However, as the back biasing potential is increased, the diode approaches a voltage break-down point, illustrated to be at approximately 10 volts, where its impedance characteristic changes sharply and then appears to be in the order of magnitude of 10 to 100 ohms.

An important thing to note about the characteristic of FIG. 2 is that the forward biasing characteristic of the diode is not employed. Consequently, it is to be understood that the voltage break-down characteristic referred to herein exists entirely in the back biased region of the diode characteristic and does not require a change of voltage polarity across the diode. Thus the essential voltage break-down characteristic which is required, according to the invention, is one which exhibits a relatively sharp current change at predetermined voltage potential, which may be referred to herein as the Zener voltage ($Ez$).

The source potential is selected so that it exceeds the voltage breakdown level of the voltage break-down device employed. Impedances Z1 and Z2 are then selected to provide sufficient actuating current for the associated amplifier to drive it into its high conduction or saturated state.

A pulse source is provided and connected to amplifiers A1 and A2 for selectively applying switching pulses to the amplifiers required to switch the state of the circuit when operated in either bistable or monostable modes.

In its general operation then the embodiment of FIG. 1 is in one state when amplifier A1 is highly conducting and device D1 is in its voltage break-down state where it appears to be a voltage source. In this state then a relatively large amount of current is drawn through load impedance Z2 and the voltage across device D2 is depressed by the drop across Z2. Device D2 consequently is in an open circuit state and amplifier A2 receives little or no actuating input current.

The cross-coupling arrangement then is completed through the connection from the output circuit of amplifier A2 to load impedance Z1. Since amplifier A2 is cut off, the voltage at the junction with load impedance Z1 attempts to rise towards the source potential providing the high voltage which was assumed necessary to maintain device D1 in its voltage break-down state. The circuit, of course, has a symmetrical state where amplifier A2 is highly conducting and amplifier A1 is in a low conduction state. In this situation then the condition of devices D1 and D2 is interchanged and D1 is in its open circuit state, and D2 is in its voltage break-down, highly conducting state, where it appears to be a voltage source.

The theory in operation of the invention may be better understood by considering several species thereof, reference being made to the other figures for this purpose. Referring specifically to type (1) of the bistable configurations of FIG. 3*a*, it is noted that the voltage break-down devices D1 and D2 are diodes. It will also be noted that in this arrangement two NPN transistors T1 and T2 are employed and have respective base electrodes connected to the anodes of diodes D1 and D2. The cathodes of the diodes are then cross-coupled to the collector electrodes of the disassociated transistors and are also connected to resistor load impedances R1 and R2 which receive a suitable biasing potential +E, selected to exceed the diode Zener voltage. Typically +E may be +15 volts.

An important feature to be noted is that emitter electrodes of the transistors are connected together and directly to ground, no common load impedance being necessary for further stability.

It will be noted that input circuits 0*a* and 1*a* are shown connected to the base electrodes of transistors T1 and T2, respectively. Positive signals are shown as being applied to circuits 0*a* and 1*a* and are effective when applied (separately) to actuate the bistable circuit into stable states which are assumed by way of an illustrative convention to represent binary 0 and binary 1, respectively. The complementary output signals A' and A then are assumed to have high levels when the flip-flop or bistable multivibrator is in 0-representing and 1-representing states, respectively.

The manner in which the flip-flop may be triggered is considered more specifically with reference to FIGS. 4 and 5 below. For present purposes it is sufficient to note that in one state of the circuit shown in FIG. 3*a*(1), diode D1 is in its voltage break-down condition and provides actuating current to transistor T1, which may be in the order of magnitude of 500 microamps. With the proper selection of the transistor amplifier type, such as those described below, transistor T1 is driven into its high conduction state with the result that a relatively large amount of current is drawn through resistor R2. The collector voltage of T1, referred to as $Ec1$ is thus depressed. Reference to a typical transistor characteristic curve shows that with +E at 15 volts and a resistor R2 of 10K ohms, voltage $Ec1$ falls to substantially .4 volt.

With this low voltage across it diode D2 is in its high impedance state and the current $Ib2$ which may pass to the base electrode of transistor T1 is in the order of $4\times10^{-9}$ amps or substantially zero. Since the transistor is a current-sensitive device, cutting off its base current prevents the flow of collector current $Ic2$, in spite of the relatively high voltage (E2) which may appear thereacross. Thus substantially the only current which passes through resistor R1 is that which passes through diode D1 to the base of T1.

In this state of the embodiment just described the output signals A' and A are respectively high and low, indicating that the flip-flop is in its zero state. A positive pulse then may be applied to input circuit 1*a* and will result in the conduction of transistor T2. This will cause the current through R1 to increase and the voltage at the cathode of diode D1 will decrease. As soon as this voltage drops below the breakdown point of diode D1, its impedance becomes extremely high and current is cut off from the base of transistor T1. The collector voltage $Ec1$ then rises, and diode D2 is actuated into its voltage break-down condition. In this manner then the flip-flop is triggered into its other stable state where signal A is high and A' is low, indicating that the flip-flop is in a 1-representing condition.

A similar bistable circuit employing PNP transistors is shown in FIG. 3*a*(2). It will be noted that the diodes are reversed so that the anodes thereof are connected to resistors R1 and R2 and the cathodes are connected to the base electrodes of the associated transistors. The source potential −E is then made greater than $Ez$ in the negative sense.

In this arrangement then negative pulses may be employed to trigger the circuit. A negative pulse applied to the base electrode of transistor T1, for example, drives it into its conduction state and raises the voltage appearing at the anode of diode D2 so that it is driven into its back biased, or prevoltage break-down state. In this manner then transistor T2 is cut off so that the voltage appearing at the anode of diode D1 falls and attempts to approach the potential −E applied to resistor R1. However, since potential −E is selected so that it is beyond the break-down potential of diode D1, this diode becomes an effective low-impedance source and provides the necessary actuating current for transistor T1.

As an interesting variation of definition it will be noted that signals A' and A are highly negative when they represent 1 and are less negative when they represent 0. Thus a negative pulse applied to input circuit 0*a* causes A' to be highly negative and A to be in a low negative state, whereas a negative pulse applied to 1*a* drives signal A into a high negative state and signal A' into its low negative state which may be near ground.

It may also be noted here that the transistors may as well be actuated by pulses of the opposite polarity. Thus in the circuit of FIG. 3*a*(1) negative pulses may be employed to cut off the transistors, and in the circuit of 3*a*(2) positive pulses may be employed to cut off the transistors. However, as a general rule, it is preferred to trigger transistor multivibrator circuits by driving them into their conduction state since this allows faster pulse response.

The arrangement of FIG. 3a(3) indicates the employment of series resistors Ra1 and Rb1 in the place of load impedance Z1 and resistors Ra2 and Rb2 in the place of load impedance Z2. These resistors may be employed either to boost the output signals A' and A above the Zener breakdown potential of diodes D1 and D2 or to reduce the amount of current passing to transistors T1 and T2 to prevent the saturation thereof.

Having described several basic forms of the invention, it is believed that the other species which are to be described may be understood quite readily. Accordingly, the following description is made brief with the emphasis being placed upon the important circuit variations to be noted.

Referring now to FIG. 3b(1) it will be noted that this circuit is similar to that shown in FIG. 3a(1) except that one diode D2 has been removed and has been replaced with a coupling capacitor C2. This device then is monostable, where the single stable state exists when transistor T1 is highly conducting and T2 is cut off. The circuit may then be actuated into its unstable state by applying a positive pulse to transistor T2, or a negative pulse to transistor T1. When this occurs transistor T2 is driven into its high conducting state and is maintained in this state as long as sufficient base current is drawn through capacitor C2 during its charging action. However, as soon as capacitor C2 is charged, the current to the base of transistor T2 is insufficient to maintain it in its conducting state and the multivibrator returns to its stable state, and capacitor C2 is discharged through transistor T1 to its original condition.

A similar arrangement employing PNP transistors is shown in FIG. 3b(2). It is believed that the manner in which this circuit operates will now be apparent without further discussion.

Another circuit which allows high voltage swings which are independent of the Zener breakdown voltage is shown in FIG. 4. In this circuit impedances Z1 and Z2 comprise resistors Ra1 and Rb1 connected in series, and resistors Ra2 and Rb2 connected in series respectively. It will also be noted that shunting capacitors C1 and C2 are connected across resistors Rb and the associated diodes D1 and D2, respectively. These capacitors enhance the trigger response of the circuit in a well-known manner.

In other respects the circuit of FIG. 4 is similar to that shown in FIG. 3a(1) and will not be further described. It will also be noted that input resistors Ri1 and Ri2 are coupled to transistors T1 and T2 respectively and are selected to have the proper impedance characteristic so that the input signals received by these transistors appears to be a constant current signal from a high impedance source. In this manner then the effect of any distributed capacity which may exist between the base electrodes of the transistors and ground is greatly reduced. The reason for this is that the time which may be required to charge a distributing capacity is a function of the voltage difference which must be established thereacross. Where the input source, however, is made to appear as a very low voltage source providing a constant current, the voltage difference is considerably less and the pulse triggering time may be greatly improved.

The operation of the embodiment of FIG. 4 is depicted in FIG. 5 wherein two triggering pulses applied to 0a and 1a are shown as an illustration of the effect. When a positive pulse is applied to 0a it will be noted the current which passes into the base of transistor T1 namely current Ib1, rises and as a result the voltage at the collector of transistor T1, namely Ec1, falls below the Zener diode break-down voltage, referred to as Ez2, of diode D2.

At the same time then the current which passes into the base of transistor T2 decreases sharply to substantially zero and consequently transistor T2 is cut off. Finally, the voltage at the collector electrode of transistor T2 rises to a level which may be noted to be equal to the Zener diode voltage Ez1 plus the voltage developed by the current Ib1 passing through the resistor Rb1 or Ib1.Rb1.

Thus in this manner the high voltage conduction, which in this case occurs at A', is not limited by the Zener diode voltage but may rise well above this level to the proper selection of the potential +E and the voltage-dividing resistors Ra and Rb.

The functioning of capacitors C1 and C2 in accentuating the cross-coupling effect in triggering the flip-flop will not be discussed since it is quite conventional.

The operation of the flip-flop in response to a positive pulse applied to 1a is similar and it will be noted that the current Ib1 is sharply decreased, the voltage Ec1 then rises to a high level which is equal to Ez2 plus Ib2.Rb2. At the same time then Ib2 rises and the collector voltage Ez2 falls below the Zener level Ez1 so that the diode D1 becomes a very high impedance.

While the invention may be utilized directly to drive a load, the effective power of the bistable configurations may be greatly enhanced in digital computer applications by means of an output signal storage technique, four different species of which are shown in FIGS. 6a, 6b, 6c and 6d.

Referring specifically to FIG. 6a, it will be noted that signals A' and A representing the state of the flip-flop are derived through output circuits 10 and 20, each of which includes an output resistor Ro (Ro1 and Ro2, respectively) and a storage capacitor Co (Co1 and Co2, respectively) having one end connected to the output resistor, the other end receiving a reference potential such as ground. The storage operation of circuits 10 and 20 of FIG. 6a is illustrated in FIG. 7a where it will be noted that a high level or 1-representing signal is developed by charging capacitors Co through associated resistors Ro, so that the time constant for charging is RoCo. In a similar manner capacitors Co are discharged through associated resistors Ro so that the same time constant is involved.

The feature of the output storage technique is that a considerable amount of power may be developed in capacitors Co between sampling signals or clock pulses, and then may be transferred during the following clock pulse or sampling interval. A typical arrangement of a plurality of bistable circuits utilizing the storage technique in this fashion is shown in FIG. 8, herein.

The power-frequency capacity of the circuit of FIG. 6a is somewhat limited due to the RC time constant involved. In FIG. 6b, then, output transistors To1 and To2 are added which allow the rapid charging of the associated capacitors Co1 and Co2 due to the fact that transistor output impedance referred to in FIG. 7b as Ri(NPN), since NPN transistors are employed for positive charging, allows a shorter time constant, namely Ri(NPN).Co. Capacitors Co then are discharged through associated resistors Ro' coupled in shunter thereacross and accordingly the discharge time constant is Ro'Co. However the discharge time of this circuit is less than that of FIG. 6a because Ro' is much less in value than Ro.

A high power frequency capacity circuit is shown in FIG. 6c where two transistors are employed for charging each capacitor referred to as To1a and To1b for capacitor Co1 and To2a and To2b for capacitor Co2. The charging characteristic for this arrangement is shown in FIG. 7c where it will be noted that both the charging and discharging time constants are dependent upon the output impedance of the transistors involved where the charging path is provided by the NPN transistor and the discharging path by the PNP transistor.

Finally, an alternate high power frequency capacity circuit is shown in FIG. 6d where the PNP transistor may be replaced with a diode so that the discharge time constant is specified by the function Rd.Co, where Rd is the output impedance of the respective flip-flop transistor.

It will be understood that while the output signal storage technique is preferred in utilizing the bistable multivibrator of the invention in digital computer practice the invention is by no means so limited and may be utilized in low power applications, for example without any output storage circuit at all.

Reference is now made to FIG. 8 where a typical utilization of the bistable multivibrator of the invention is shown. In FIG. 8 only one of the bistable multivibrators is shown in specific detail, namely flip-flop D and the remaining circuits are shown in block form with corresponding notation. The counting sequence of the circuit is shown in the "truth" table associated therewith and the logical algebra specifying the gating requirement is also shown.

The particular counting logic will not be considered since it is conventional, other similar counters, for example, being shown in Patent No. 2,644,887 by Wolfe. However, an important feature to be noted is the inclusion of input resistors R*i*1 and R*i*2 shown in circuit D whereby the clock pulse voltage pulse C*p* which is gated through the logical network is effectively converted into a current signal of very low voltage amplitude which appears at the base electrodes of the associated transistors.

In this manner the flip-flops may be triggered by current pulses rather than voltage pulses and the effect of distributed capacity appearing between the base electrode and ground is almost nullified.

This technique of inserting a series current switch or Zener break-down device, in the input circuit of the transistor flip-flop then is preferred due to the fact that it takes best advantage of the current sensitivity triggering characteristic which is achieved in accordance with the present invention. It may be noted again here that this current triggering technique would not be possible in conventional voltage feedback flip-flops where the emitter electrodes would have to be connected to a common biasing impedance to insure stability.

The particuular logical gating technique employed will not be described since it is fully covered in the following publication: Transactions of the I.R.E. Professional Group on Electronic Computers, volume EC–4, Number 1, March, 1955, by Cravens L. Wanlass.

The transistors and diodes shown in FIG. 8 may be types manufactured by the Texas Instruments company since August 20, 1954, through the present date of May 13, 1955. These types are listed below with other typical circuit constants.

| | |
|---|---|
| Transistor To1*a* | NPN silicon Type 904. |
| Transistor To2*a* | NPN silicon Type 904. |
| Transistor T1 | NPN silicon Type 904. |
| Transistor T2 | NPN silicon Type 904. |
| Transistor To1*b* | PNP germanium Type 301. |
| Transistor To2*b* | PNP germanium Type 301. |
| Diode D1 | Type 604. |
| Diode D2 | Type 604. |
| Other Diodes | Type 601C. |
| Resistor R*a*1 | 8200 ohms. |
| Resistor R*a*2 | 8200 ohms. |
| Resistor R*b*1 | 43,000 ohms. |
| Resistor R*b*2 | 43,000 ohms. |
| Resistor R*i*1 | 10,000 ohms. |
| Resistor R*i*2 | 10,000 ohms. |
| Clock pulse resistor RC*p* | 10,000 ohms. |
| Capacitor C1 | 100 micromicrofarads. |
| Capacitor C2 | 100 micromicrofarads. |
| Capacitor C*o*1 | 0.003 microfarad. |
| Capacitor C*o*2 | 0.003 microfarad. |
| Source potential +E | 20 volts. |
| Clock pulse C*p* | +20 volts. |

From the foregoing description it is apparent that the present invention provides an improved type of multivibrator circuit wherein high stability is achieved without major limitation upon the trigger response frequency, the pulse sensitivity of the power-supplying capacity of the circuit.

It should now be apparent that the essential feature of the invention resides in the utilization of a voltage break-down device in current series with the low impedance input circuit of at least one amplifier employed in a cross-coupled arrangement.

What is claimed is:

1. A multivibrator circuit comprising: first and second amplifiers each operable between high and low voltage output conditions, each amplifier having a relatively low impedance input circuit and a relatively high impedance output circuit that includes a respective load impedance; and at least one voltage break-down element conductively coupled between the load impedance of said first amplifier and the input circuit of said second amplifier, the load impedance of said second amplifier being coupled to the input circuit of said first amplifier, said break-down element comprising a diode, bias means connected to said first amplifier load impedance back-biasing said diode, such that it substantially inhibits the passage of any current therethrough for one condition of said first amplifier and passes substantially all of the current applied thereto to the input circuit of the second amplifier in response to the other condition of said first amplifier.

2. The multivibrator defined in claim 1 wherein said amplifiers are transistors, each transistor including a base, a collector, and an emitter electrode, the base electrodes of said transistors being in said input circuits, and the collector electrodes of said transistors being in said output circuits.

3. The multivibrator circuit defined in claim 1 wherein a second voltage break-down device having characteristics similar to said one voltage break-down device serves to couple the load impedance of said second amplifier to the input circuit of said first amplifier, the arrangement constituted thereby being bistable.

4. The multivibrator circuit defined in claim 1 wherein the coupling between the impedance of said second amplifier and the input circuit of said first amplifier is an A.C. coupling, whereby said circuit is monostable.

5. The multivibrator circuit defined in claim 1 wherein the couplings between the impedances in the output circuits of said amplifiers and the input circuits of said amplifiers each includes a respective A.C. coupling device, whereby said circuit is a free-running multivibrator.

6. An electrical triggered circuit, comprising: first transistor means including first collector, first emitter and first base electrode means; second transistor means including second emitter, second base and second collector electrode means; emitter-collector bias supply means for said transistor means; first and second resistor means respectively coupling said first and second transistor means to said bias means; first Zener diode means and third resistor means serially connected between said first collector means and said second base means; second Zener diode means and fourth resistor means serially connected between said second collector means and said first base means; said first and second Zener diode means being polarized so that said bias source forces current therethrough in the reverse-current direction thereof to bring about alternate Zener breakdown therein only when said first and second transistor means respectively are not conducting; the Zener breakdown voltage of said diodes being different in magnitude and less in magnitude than the magnitude of the output voltage of said bias source; and pulse source means coupled to each said respective base electrode means for applying voltage pulses thereto of a polarity to cut off flow of current through each said associated transistor means.

7. Apparatus for producing electrical pulses, comprising: first and second electric valve means, each including first and second terminal electrodes and control electrode means for controlling current flow between said terminal electrodes; a potential source; first and second impedance means for coupling said potential source to said terminal electrodes of said first and second valve means respectively; said control electrode of said second valve means and first Zener diode means coupled by third impedance means between the juncture of said first impedance means and said first valve means; said control electrode of said first valve means and second Zener diode means coupled by fourth impedance means between the juncture of said second impedance means and second valve means; said first and second Zener diode means being polarized so that said potential source forces current therethrough in the direction to bring about alternate Zener breakdown therein; the Zener breakdown voltage of said first diode being different in magnitude from that of said second diode; said first and second Zener diodes breaking down only when said first and second valve means, respectively, are not conducting; and control voltage means coupled to said control electrodes for applying pulses thereto of a polarity to cut off flow of current through said valve means.

8. An electrical multivibrator comprising: first and second electric valve means respectively having first and second control electrodes for controlling current flow therethrough; first and second impedance means respectively coupling to a voltage source across said first and second electric valve means, first Zener diode means for coupling said first control electrode to said second impendance means when the voltage across said second valve exceeds a first predetermined magnitude; second Zener diode means for coupling said second control electrode to said first impedance means when the voltage across said first valve means exceeds a second predetermined magnitude less than said first predetermined magnitude; said first and second Zener diodes breaking down and allowing reverse current flow therein only when said second and first valve means, respectively, are not conducting; and control voltage means coupled to said control electrodes for alternately biasing said first and second valve means to cutoff.

References Cited in the file of this patent

UNITED STATES PATENTS

| | | |
|---|---|---|
| 2,366,076 | Wilbur | Dec. 26, 1944 |
| 2,502,687 | Weiner | Apr. 4, 1950 |
| 2,506,439 | Bergfors | May 2, 1950 |
| 2,545,349 | Foster | Mar. 13, 1951 |
| 2,655,609 | Shockley | Oct. 13, 1953 |
| 2,724,780 | Harris | Nov. 22, 1955 |
| 2,737,587 | Trousdale | Mar. 6, 1956 |
| 2,772,410 | Logue et al. | Nov. 27, 1956 |
| 2,787,712 | Priebe et al. | Apr. 2, 1957 |
| 2,803,747 | Woods | Aug. 20, 1957 |
| 2,820,155 | Linvill | Jan. 14, 1958 |
| 2,831,986 | Sumner | Apr. 22, 1958 |
| 2,840,728 | Haugk et al. | June 24, 1958 |
| 2,880,330 | Linvill | Mar. 31, 1959 |

FOREIGN PATENTS

| | | |
|---|---|---|
| 1,122,425 | France | May 22, 1956 |